US008918673B1

(12) United States Patent
Rangaiah et al.

(10) Patent No.: US 8,918,673 B1
(45) Date of Patent: Dec. 23, 2014

(54) SYSTEMS AND METHODS FOR PROACTIVELY EVALUATING FAILOVER NODES PRIOR TO THE OCCURRENCE OF FAILOVER EVENTS

(75) Inventors: Jagadamba Rangaiah, Mountain View, CA (US); Tushar Doshi, Santa Clara, CA (US); Anish Vaidya, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 183 days.

(21) Appl. No.: 13/523,745

(22) Filed: Jun. 14, 2012

(51) Int. Cl.
*G06F 11/00* (2006.01)
(52) U.S. Cl.
USPC .......................................... 714/4.11
(58) Field of Classification Search
CPC .......................... G06F 11/2028; G06F 11/2038
USPC .......................................... 714/4.11
See application file for complete search history.

(56) References Cited

U.S. PATENT DOCUMENTS

| 6,922,791 | B2 * | 7/2005 | Mashayekhi et al. | ........ 714/4.11 |
| 7,213,246 | B1 * | 5/2007 | van Rietschote et al. | ......... 718/1 |
| 7,783,914 | B1 * | 8/2010 | Havemose | .................... 714/4.11 |
| 8,156,490 | B2 * | 4/2012 | Bozek et al. | ...................... 718/1 |
| 8,185,776 | B1 * | 5/2012 | Gentes et al. | ................ 714/4.11 |
| 2011/0023028 | A1 * | 1/2011 | Nandagopal et al. | ............. 718/1 |
| 2013/0067267 | A1 * | 3/2013 | Tamhane et al. | ............. 714/4.11 |

\* cited by examiner

*Primary Examiner* — Yolanda L Wilson
(74) *Attorney, Agent, or Firm* — ALG Intellectual Property, LLC

(57) ABSTRACT

A computer-implemented method for proactively evaluating failover nodes prior to the occurrence of failover events may include (1) identifying at least one primary node that services at least one application, (2) identifying at least one failover node designated to service the application if the primary node were to fail, (3) prior to detecting failure of the primary node, proactively evaluating the failover node's ability to service the application if the primary node were to fail, and then (4) in response to determining that the failover node would be unable to adequately service the application if the primary node were to fail, proactively performing at least one corrective action that would cause the application to be adequately serviced if the primary node were to fail. Various other methods, systems, and computer-readable media are also disclosed.

20 Claims, 7 Drawing Sheets

SYSTEMS AND METHODS FOR PROACTIVELY EVALUATING FAILOVER NODES PRIOR TO THE OCCURRENCE OF FAILOVER EVENTS

BACKGROUND

Organizations increasingly depend on critical applications and data in the course of business. For this reason, organizations may attempt to both minimize the downtime of critical applications and control the risk of losing sensitive data managed by such applications.

For example, an organization may attempt to reduce application downtime by implementing a high-availability computer cluster in which a primary node responsible for servicing an application fails over to at least one secondary node in the event of a failure at the primary node. In this example, if the primary node fails, the secondary node would take on the role of the primary node in an attempt to reduce application downtime.

Unfortunately, existing failover technologies may suffer from one or more shortcomings and/or inefficiencies. For example, existing failover technologies may fail to evaluate the ability of a secondary (or "failover") node to adequately service an application prior to attempting to fail the application over to the secondary node. As such, existing failover technologies may attempt to fail an application over to a secondary node after detecting a failure at a primary node, only to discover that the secondary node is unable to adequately service the application (due to, e.g., a software or hardware failure). This may, in turn, result in increased application downtime and/or data loss.

SUMMARY

As will be described in greater detail below, the instant disclosure generally relates to systems and methods for proactively evaluating failover nodes prior to the occurrence of failover events in order to reduce the downtime that may occur from attempting to fail an application over to a node that is unable to adequately service the application. In one example, a computer-implemented method for performing such a task may include (1) identifying at least one primary node that services at least one application, (2) identifying at least one failover node designated to service the application if the primary node were to fail, (3) prior to detecting failure of the primary node, proactively evaluating the failover node's ability to service the application if the primary node were to fail by (a) identifying a failover policy that specifies criteria that the failover node must satisfy in order to adequately service the application and (b) determining, by applying the criteria of the failover policy to the failover node, that the failover node would be unable to adequately service the application if the primary node were to fail, and then (4) in response to determining that the failover node would be unable to adequately service the application if the primary node were to fail, proactively performing at least one corrective action that would cause the application to be adequately serviced if the primary node were to fail.

In one example, the step of identifying the failover node may include (1) retrieving a prioritization list that specifies a user-defined order for selecting failover nodes if the primary node were to fail and then (2) identifying the failover node within the prioritization list. In another example, the step of identifying the failover node may include (1) identifying a plurality of failover candidates, (2) automatically generating, by applying the criteria of the failover policy to the failover candidates, a prioritization list that identifies a preferred order for selecting failover nodes from the failover candidates if the primary node were to fail, and then (3) identifying the failover node within the prioritization list. In this example, the method may also include, upon generating the prioritization list, automatically configuring each failover node identified in the prioritization list to service the application.

In one embodiment, the failover node's ability to service the application may be proactively evaluated on a periodic basis. In another embodiment, the failover node's ability to service the application may be proactively evaluated by registering with a monitoring framework to be notified of events that would impact the failover node's ability to service the application. In this embodiment, at a later point in time, a notification may be received, via the monitoring framework, of an event that would impact the failover node's ability to service the application.

In one example, the step of proactively evaluating the failover node's ability to service the application may include (1) identifying at least one attribute flag associated with the failover node that identifies the failover node's ability to service the application and then (2) determining, by evaluating the attribute flag associated with the failover node, that the failover node would be unable to adequately service the application if the primary node were to fail.

In some examples, the step of proactively performing the corrective action may include (1) generating at least one notification that indicates that the failover node is unable to adequately service the application, (2) automatically correcting at least one issue that is preventing the failover node from being able to adequately service the application, (3) preventing the failover node from servicing the application if the primary node were to fail, and/or (4) prioritizing at least one other failover node that satisfies the criteria of the failover policy over the failover node. In one example, the step of prioritizing the other failover node that satisfies the criteria of the failover policy over the failover node may include overriding a prioritization list that identifies a user or administrator-defined order for selecting failover nodes if the primary node were to fail.

In one embodiment, a system for implementing the above-described method may include an identification module programmed to identify both (1) at least one primary node that services at least one application and (2) at least one failover node designated to service the application if the primary node were to fail. The system may also include an evaluation module programmed to proactively (i.e., before detecting failure of the primary node) evaluate the failover node's ability to service the application if the primary node were to fail by (a) identifying a failover policy that specifies criteria that the failover node must satisfy in order to adequately service the application and (b) determining, by applying the criteria of the failover policy to the failover node, that the failover node would be unable to adequately service the application if the primary node were to fail. The system may also include a correction module programmed to proactively perform at least one corrective action that would cause the application to be adequately serviced if the primary node were to fail. In some examples, the system may also include at least one processor configured to execute the identification module, the evaluation module, and the correction module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify at least one primary node that services at least one application, (2) identify at least one failover node designated to service the application if the primary node were to fail, (3) prior to detecting failure of the primary node, proactively evaluate the failover node's ability to service the application if the primary node were to fail by (a) identifying a failover policy that specifies criteria that the failover node must satisfy in order to adequately service the application and (b) determining, by applying the criteria of the failover policy to the failover node, that the failover node would be unable to adequately service the application if the primary node were to fail, and then (4) in response to determining that the failover node would be unable to adequately service the application if the primary node were to fail, proactively perform at least one corrective action that would cause the application to be adequately serviced if the primary node were to fail.

As will be explained in greater detail below, by proactively evaluating failover nodes prior to the occurrence of failover events, the systems and methods described herein may reduce and/or eliminate the downtime that may occur from attempting to fail an application over to a node that is unable to adequately service the application. In addition, by automatically selecting and/or configuring failover nodes based on various criteria, the systems and methods described herein may avoid having to rely on static (and thus potentially out-of-date) user-defined failover lists.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
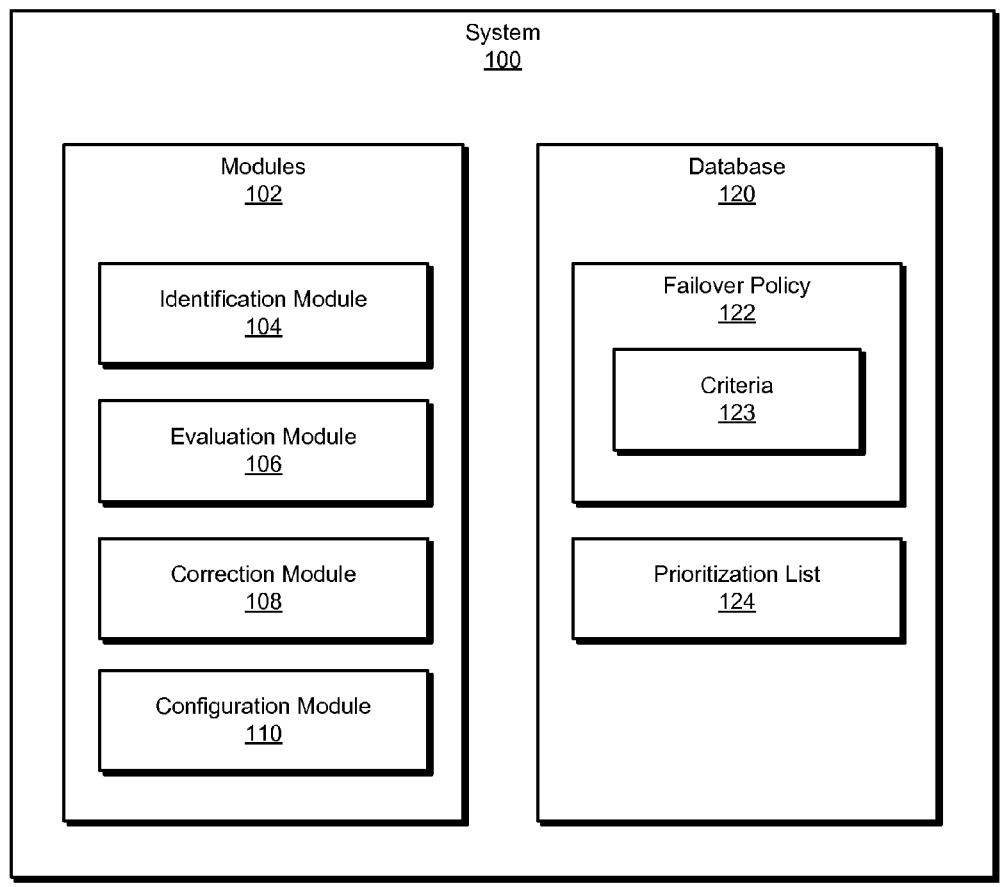
FIG. 1 is a block diagram of an exemplary system for proactively evaluating failover nodes prior to the occurrence of failover events.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
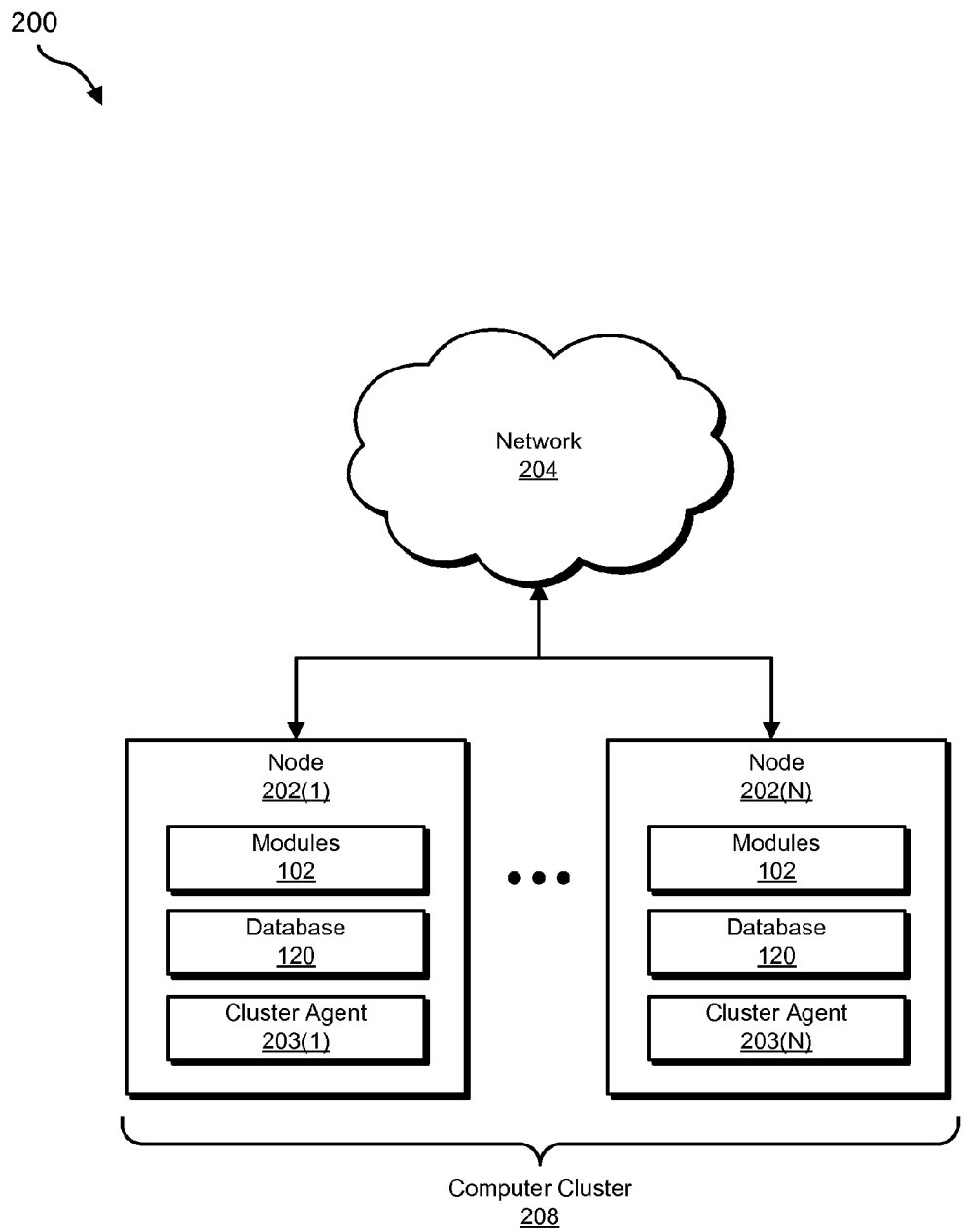
FIG. 2 is a block diagram of an additional exemplary system for proactively evaluating failover nodes prior to the occurrence of failover events.
Figure 3:
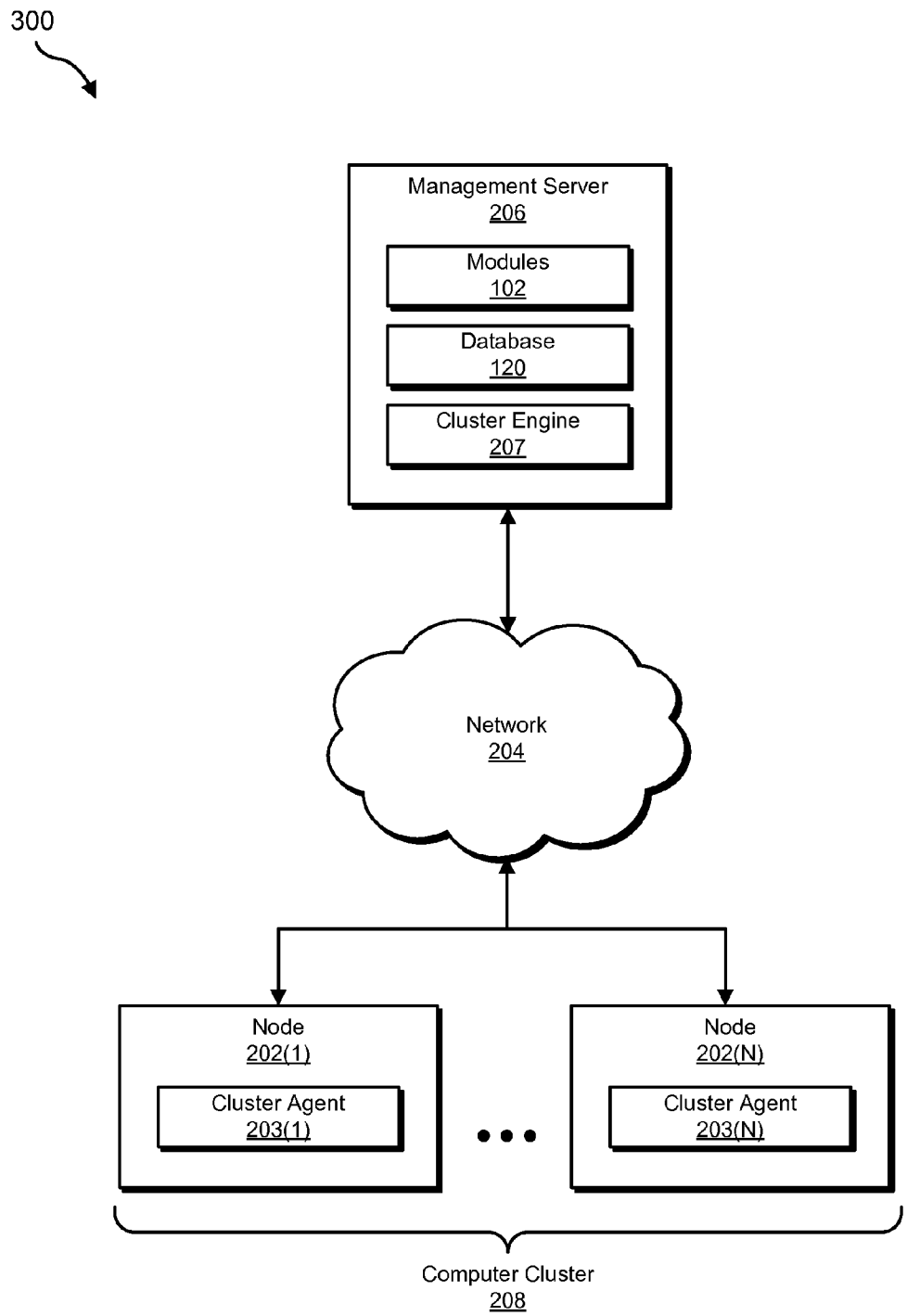
FIG. 3 is a block diagram of an additional exemplary system for proactively evaluating failover nodes prior to the occurrence of failover events.

The following will provide, with reference to FIGS. 1-3, detailed descriptions of exemplary systems for proactively evaluating failover nodes prior to the occurrence of failover events. Detailed descriptions of corresponding computer-implemented methods will also be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for proactively evaluating failover nodes prior to the occurrence of failover events. As illustrated in this figure, exemplary system 100 may include one or more modules 102 for performing one or more tasks. For example, and as will be explained in greater detail below, exemplary system 100 may include an identification module 104 programmed to identify both (1) a primary node that services an application and (2) at least one failover node designated to service the application if the primary node were to fail. Exemplary system 100 may also include an evaluation module 106 programmed to proactively (i.e., before the primary node fails) evaluate the failover node's ability to service the application if the primary node were to fail.

In addition, and as will be described in greater detail below, exemplary system 100 may include a correction module 108 programmed to perform at least one corrective action that would cause the application to be adequately serviced if the primary node were to fail. Exemplary system 100 may also include a configuration module 110 programmed to automatically configure failover nodes to service applications. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2 and 3 (e.g., nodes 202(1)-(N) and/or management server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store at least one failover policy 122 that specifies criteria 123 that failover nodes must satisfy in order to adequately service a particular application. Database 120 may also contain a prioritization list 124 that specifies a preferred order for selecting one or more failover nodes in the event that a primary node responsible for servicing a particular application fails.

Database 120 may represent portions of a single database or computing device or a plurality of databases or computing devices. For example, database 120 may represent a portion of nodes 202(1)-(N) and/or management server 206 in FIGS. 2 and 3, computing system 610 in FIG. 6, and/or portions of exemplary network architecture 700 in FIG. 7. Alternatively, database 120 in FIG. 1 may represent one or more physically separate devices capable of being accessed by a computing device, such as nodes 202(1)-(N) and/or management server 206 in FIGS. 2 and 3, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2 and/or exemplary system 300 in FIG. 3. Specifically, one or more of modules 102 from FIG. 1 may, when executed by at least one processor of nodes 202(1)-(N) and/or management server 206, cause nodes 202(1)-(N) and/or management server 206 to proactively evaluate failover nodes prior to the occurrence of failover events by (1) identifying at least one primary node (e.g., node 202(1)) that services at least one application, (2) identifying at least one failover node (e.g., node 202(N)) designated to service the application if the primary node were to fail, (3) proactively evaluating the failover node's ability to service the application if the primary node were to fail, and then, if the failover node would be unable to adequately service the application if the primary node were to fail, (4) proactively performing at least one corrective action that would cause the application to be adequately serviced if the primary node were to fail.

In the examples illustrated in FIGS. 2 and 3, nodes 202(1)-(N) may collectively form a computer cluster 208 capable of communicating with one another to collectively perform one or more tasks, such as collectively providing high availability of at least one application and/or collectively executing at least one application. Although not illustrated in FIG. 2, computer cluster 208 may also include one or more shared resources (e.g., one or more storage devices) configured to store data used by such an application and/or a server configured to control execution of such an application by the nodes. Examples of computer cluster 208 include, without limitation, high-availability clusters, load-balancing clusters, Beowolf clusters, high-performance computing clusters, or any other suitable computer clusters.

Nodes 202(1)-(N) generally represent any type or form of computing device capable of reading computer-executable instructions. Examples of nodes 202(1)-(N) include, without limitation, laptops, desktops, servers, cellular phones, personal digital assistants (PDAs), multimedia players, embedded systems, combinations of one or more of the same, exemplary computing system 610 in FIG. 6, or any other suitable computing devices.

In some examples, each of nodes 202(1)-(N) may include a cluster agent, such as cluster agents 203(1)-(N). Cluster agents 203(1)-(N) generally represent any type or form of software module capable of communicating and/or coordinating either with other nodes and/or a cluster engine (such as cluster engine 207 in FIG. 3) as part of a high-availability computer cluster. In some examples, cluster agents 203(1)-(N) may be configured to execute an application as part of a high-availability computer cluster. Cluster agents 203(1)-(N) may also enable cluster engine 207 to control execution of the application within a high-availability computer cluster. In some examples, cluster agents 203(1)-(N) may represent at least a portion of high-availability cluster software (e.g., SYMANTEC'S VERITAS CLUSTER SERVER software).

In one example, nodes 202(1)-(N) may communicate with one another via a network 204. Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections.

In one example, nodes 202(1)-(N) may collectively manage and/or coordinate the resources of computer cluster 208. For example, and as illustrated in FIG. 2, cluster agents 203(1)-(N) on nodes 202(1)-(N) may, by communicating directly with one another, collectively manage and/or coordinate the resources of computer cluster 208. In another example, an additional management device may help manage and/or coordinate the resources of computer cluster 208. For example, and as illustrated in FIG. 3, management server 206 may, by communicating with cluster agents 203(1)-(N) on nodes 202(1)-(N), manage and/or coordinate the resources of computer cluster 208.

Management server 206 generally represents any type or form of computing device capable of controlling and/or managing nodes within computer clusters. Examples of management server 206 include, without limitation, application servers, web servers, and database servers configured to provide various web and/or database services and/or run certain software applications.

Figure 4:
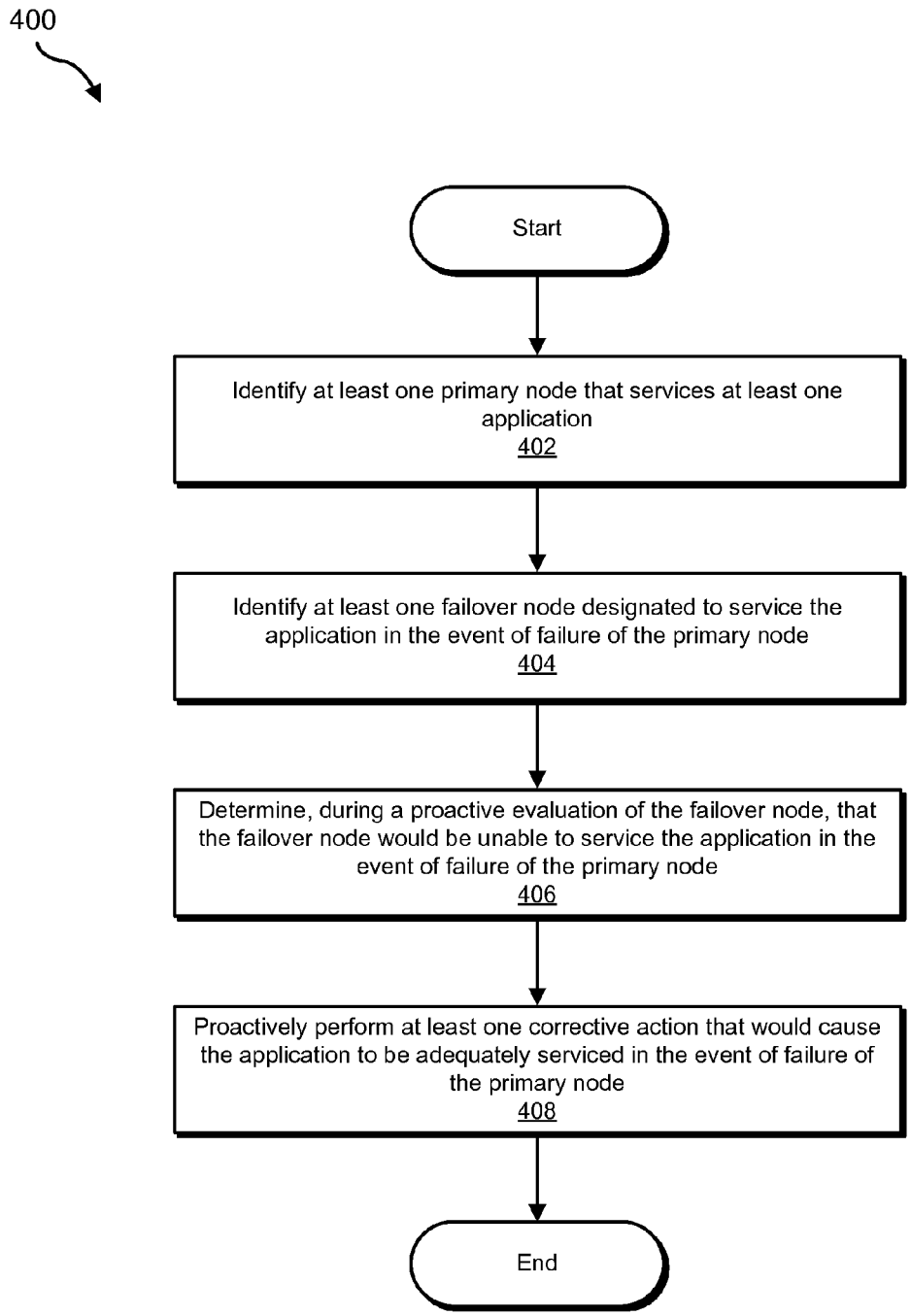
FIG. 4 is a flow diagram of an exemplary method for proactively evaluating failover nodes prior to the occurrence of failover events.

FIG. 4 is a flow diagram of an exemplary computer-implemented method 400 for proactively evaluating failover nodes prior to the occurrence of failover events. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402 the systems described herein may identify at least one primary node that services at least one application. For example, identification module 104 may, as part of one or more of nodes 202(1)-(N) and/or management server 206 in FIG. 2 or 3, determine that node 202(1) within computer cluster 208 is currently servicing one or more applications.

The term "primary node," as used herein, generally refers to a node within a computer cluster that is currently servicing (i.e., hosting and/or providing resources for) an application. In contrast, the terms "failover node" or "secondary node" generally refer to nodes that have been designated to service (but which are not currently servicing) an application in the event of the failure of a primary node.

The systems described herein may perform step 402 in a variety of ways. In some examples, identification module 104 may (either as part of one or more of nodes 202(1)-(N) and/or as part of management server 206) identify the primary node by accessing information that identifies each of nodes 202(1)-(N) within computer cluster 208. For example, identification module 104 may, by querying database 120, access information that identifies each of nodes 202(1)-(N) (and/or any other devices or resources included in computer cluster 208) using an identification address (such as an IP address or a MAC address), a physical or virtual location, a node registration key, and/or a status identifier (e.g., "primary," "failover/secondary," etc.). By analyzing this information, identification module 104 may identify a node that is currently servicing an application (i.e., a "primary" node).

In another example, identification module 104 may (either as part of one or more of nodes 202(1)-(N) and/or as part of management server 206) identify the primary node by receiving a notification from one or more of nodes 202(1)-(N). For example, at least one node within computer cluster 208 may send a notification to identification module 104 that indicates that the sending node has been designated as a primary node. In one example, this notification may be sent as part of a boot-up process (initiated, e.g., when one or more of nodes 202(1)-(N) are powered on by a user).

In an additional example, identification module 104 may (either as part of one or more of nodes 202(1)-(N) and/or as part of management server 206) probe nodes 202(1)-(N) via network 204 to determine the configuration of computer cluster 208. For example, identification module 104 may send a request for identification to nodes 202(1)-(N). In this example, in response to receiving the request for identification, nodes 202(1)-(N) may send information to identification module 104 that identifies both the sending node and its status (e.g., "primary," "failover/secondary," etc.).

At step 404, the systems described herein may identify at least one failover node designated to service the application if the primary node were to fail. For example, identification module 104 may, either as part of one or more of nodes 202(1)-(N) and/or as part of management server 206, determine that node 202(N) has been designated as a failover node to service an application currently serviced by node 202(1) if node 202(1) were to fail.

As with step 402, the systems described herein may perform step 404 in a variety of ways. For example, identification module 104 may (either as part of one or more of nodes 202(1)-(N) and/or as part of management server 206) identify the failover node by (1) accessing information that identifies each of nodes 202(1)-(N) within computer cluster 208, (2) receiving a notification from one or more of nodes 202(1)-(N), and/or (3) probing nodes 202(1)-(N) via network 204 to determine the configuration of computer cluster 208.

In some examples, computer cluster 208 may maintain a prioritization list (e.g., prioritization list 124 in FIG. 1) that specifies an order for selecting failover nodes in the event of the failure of a primary node. In one example, this prioritization list may only identify a single failover node. In other examples, this prioritization list may identify a plurality of failover nodes (such as one or more nodes within a cloud computing environment).

In some examples, the preferred order for selecting failover nodes in the event of the failure of the primary node may be specified by a user or administrator. In other examples, this prioritization order may be automatically generated and/or modified. For example, identification module 104 may automatically evaluate and rank or prioritize nodes within computer cluster 208 based on a variety of criteria relevant to determining whether a particular node would be able to adequately service the application in question in the event of a failover. In this example, identification module 104 may then create and/or modify prioritization list 124 based on this automatically generated order.

Examples of the types of criteria that may be used in such an evaluation include, without limitation, criteria for evaluating the health of a node (i.e., criteria for evaluating the operational status and/or performance of various software and/or hardware components of the node), criteria for evaluating whether the node satisfies various prerequisites associated with the application in question (e.g., mount points, application-specific binaries, configuration files, or the like that may be required by the application for proper operation), and/or any other criteria that may be relevant to determining whether the node would be able to adequately service the application if the primary node were to fail.

In some examples, the systems described herein may, upon generating the prioritization list, automatically configure one or more failover nodes identified in the prioritization list to service the application. For example, identification module 104 may automatically modify various mount points, application-specific binaries, configuration files, or the like within each failover node identified within prioritization list 124 in order to ensure that these nodes satisfy the various prerequisites associated with the application in question.

At step 406, the systems described herein may proactively evaluate the failover node's ability to service the application in the event of the failure of the primary node. For example, evaluation module 106 may, either as part of one or more of nodes 202(1)-(N) and/or management server 206, proactively evaluate the ability of node 202(N) to service the application currently serviced by node 202(1).

The systems described herein may perform step 406 in a variety of ways. In one example, the systems described herein may (1) identify a failover policy that specifies criteria that failover nodes must satisfy in order to adequately service the application and then (2) determine, by applying the criteria of the failover policy to the failover node, if the failover node would be able to adequately service the application in the event of the failure of the primary node. For example, evaluation module 106 may determine, by applying criteria 123 of failover policy 122 in FIG. 1 to node 202(N), that node 202(N) currently fails to satisfy at least a portion of criteria 123, such that node 202(N) would be unable to adequately service the application currently serviced by node 202(1) if node 202(1) were to fail.

Examples of the types of criteria that may be used in such an evaluation include, without limitation, criteria for evaluating the health of a node (i.e., criteria for evaluating the operational status and/or performance of various software and/or hardware components of the node), criteria for evaluating whether the node satisfies various prerequisites associated with the application in question (e.g., mount points, application-specific binaries, configuration files, or the like that may be required by the application for proper operation), and/or any other criteria that may be relevant to determining whether the node would be able to adequately service the application if the primary node were to fail.

Figure 5A:
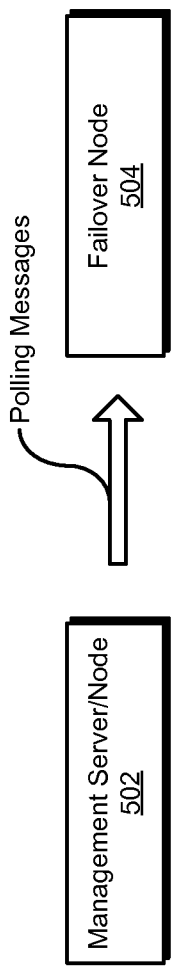
FIGS. 5A and 5B are block diagrams illustrating various exemplary techniques for proactively evaluating failover nodes prior to the occurrence of failover events.

In one example, the systems described herein may proactively evaluate the failover node in step 406 on a periodic basis. For example, and as illustrated in FIG. 5A, evaluation module 106 may, as part of management server/node 502 (which may represent either one or more of nodes 202(1)-(N) or management server 206), send periodic polling messages to failover node 504. In this example, these polling messages may request that failover node 504 provide responses containing information sufficient to evaluate whether failover node 504 would be able to adequately service the application in question (i.e., information sufficient to evaluate whether failover node 504 satisfies the various criteria associated with the application in question).

Figure 5B:
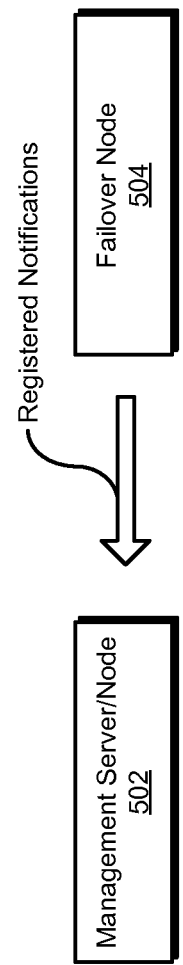

In another example, the systems described herein may perform step 406 by registering with a monitoring framework to be notified of events that would impact the failover node's ability to service the application in question. In this example, and as illustrated in FIG. 5B, if an event occurs that would impact the ability of failover node 504 to service the application in question, then failover node 504 (and/or a monitoring framework on failover node 504) would automatically generate and transmit a notification to management server/node 502 that notifies management server/node 502 of the same. Examples of such events include, without limitation, events that would impact the health of a node (i.e., events that would impact the operational status and/or performance of various software and/or hardware components of the node), events that would impact the node's ability to satisfy various prerequisites associated with the application in question (e.g., mount points, application-specific binaries, configuration files, or the like that may be required by the application for proper operation), and/or any other event that may be relevant to determining whether the node would be able to adequately service the application if the primary node were to fail.

The systems described herein may register to be notified of events that would impact a failover node's ability to service an application in a variety of ways. In some examples, one or more of cluster agents 203(1)-(N) and/or cluster engine 207 may activate an operating system kernel driver (e.g., SYMANTEC'S ASYCHRONOUS MONITORING FRAMEWORK (AMF)) that interfaces with the operating system kernel installed on a failover node to facilitate generating an immediate notification of any changes in the operating state of the failover node. For example, cluster engine 207 may configure an operating system kernel driver that interfaces with the operating system kernel installed on node 202(N) to generate an immediate notification whenever the operating status of cluster agent 203(N) changes from a running state to a stalled or malfunctioning state. In this example, if the operating status of cluster agent 203(N) changes, then the operating system kernel driver may send a notification to cluster engine 207 that indicates that node 202(N) would be unable to service the application currently serviced by node 202(1) if node 202(1) were to fail.

In one example, the operating system kernel drivers activated on nodes 202(1)-(N) may use an interrupt (e.g., a hardware interrupt) to notify cluster engine 207 of any change in operating status. For example, cluster engine 207 may configure a hardware interrupt located on node 202(N) to be triggered whenever the operating status associated with cluster agent 203(N) changes from a running state to a stalled or malfunctioning state. In this example, when the hardware interrupt is triggered, the operating system kernel may immediately generate a notification indicating that the operating state associated with cluster agent 203(N) has changed from a running state to a stalled state. The operating system kernel driver activated on node 202(N) may then send this notification to cluster engine 207 to notify cluster engine 207 of the same.

In one example, cluster agents 203(1)-(N), cluster engine 207, and/or the above-described operating system kernels may determine whether a particular failover node would be able to adequately service an application by evaluating an attribute flag associated with the failover node that identifies the failover node's ability to service the application. For example, cluster agent 203(N) on node 202(N) may set the attribute flag "ReadyToOnline" to "1" if node 202(N) is currently able to provide failover service for an application (i.e., if node 202(N) currently satisfies all of the various criteria required to adequately service the application). Alternatively, cluster agent 203(N) on node 202(N) may set the attribute flag "ReadyToOnline" to "0" if node 202(N) is currently unable to provide failover service for an application (i.e., if node 202(N) does not currently satisfy all of the various criteria required to adequately service the application). In either case, cluster agent 203(N) may then transmit a notification to cluster agent 203(1) and/or cluster engine 207 that identifies this attribute value, which may in turn store the same within database 120. In this example, the cluster agent and/or engine may, when failing over an application from a primary node to one or more failover nodes, avoid all failover nodes for which the attribute flag "ReadyToOnline" has been set to "0."

Returning to FIG. 4, at step 408 the systems described herein may proactively perform at least one corrective action that would cause the application to be adequately serviced if the primary node were to fail. For example, correction module 108 may, either as part of one or more of nodes 202(1)-(N) or management server 206, proactively perform at least one corrective action that would cause the application currently serviced by node 202(1) to be adequately serviced if node 202(1) were to fail.

The systems described herein may perform step 408 in a variety of ways and contexts. In one example, the systems described herein may automatically correct at least one issue that is preventing the failover node from being able to adequately service the application in question. For example, correction module 108 may modify various mount points, application-specific binaries, configuration files, or the like of node 202(N) in order to ensure that node 202(N) would be able to adequately service the application in question.

In another example, the systems described herein may prevent the failover node in question from servicing the application if the primary node were to fail. For example, correction module 108 may prevent node 202(N) from servicing the application in question either indefinitely or until node 202(N) satisfies the criteria required to adequately service the application in question.

In another example, the systems described herein may simply prioritize at least one other failover node that satisfies the criteria associated with the application in question over the failover node. For example, correction module 108 may retrieve and modify prioritization list 124 such that at least one other node will be ranked ahead of (and thus selected before) node 202(N). Since, as detailed above, prioritization list 124 may include a user-defined order for selecting failover nodes in the event of a primary node failure, correction module 108 may need to override and/or modify this user-defined order in order to ensure that the application in question will be adequately serviced in the event of a failover.

In another example, the systems described herein may generate and transmit at least one notification that indicates that the failover node is unable to adequately service the application. For example, correction module 108 may notify an administrator of computer cluster 208 that node 202(N) would be unable to adequately service the application in question in the event of a failover. In some examples, this notification may include information that identifies an event responsible for this failure (e.g., a software or hardware component failure) and/or instructions for resolving the same.

Upon completion of step 408, the logical flow of exemplary method 400 in FIG. 4 may terminate.

As detailed above, by proactively evaluating failover nodes prior to the occurrence of failover events, the systems and methods described herein may reduce and/or eliminate the downtime that may occur from attempting to fail an application over to a node that is unable to adequately service the application. In addition, by automatically selecting and/or configuring failover nodes based on various criteria, the systems and methods described herein may avoid having to rely on static (and thus potentially out-of-date) user-defined failover lists.

Figure 6:
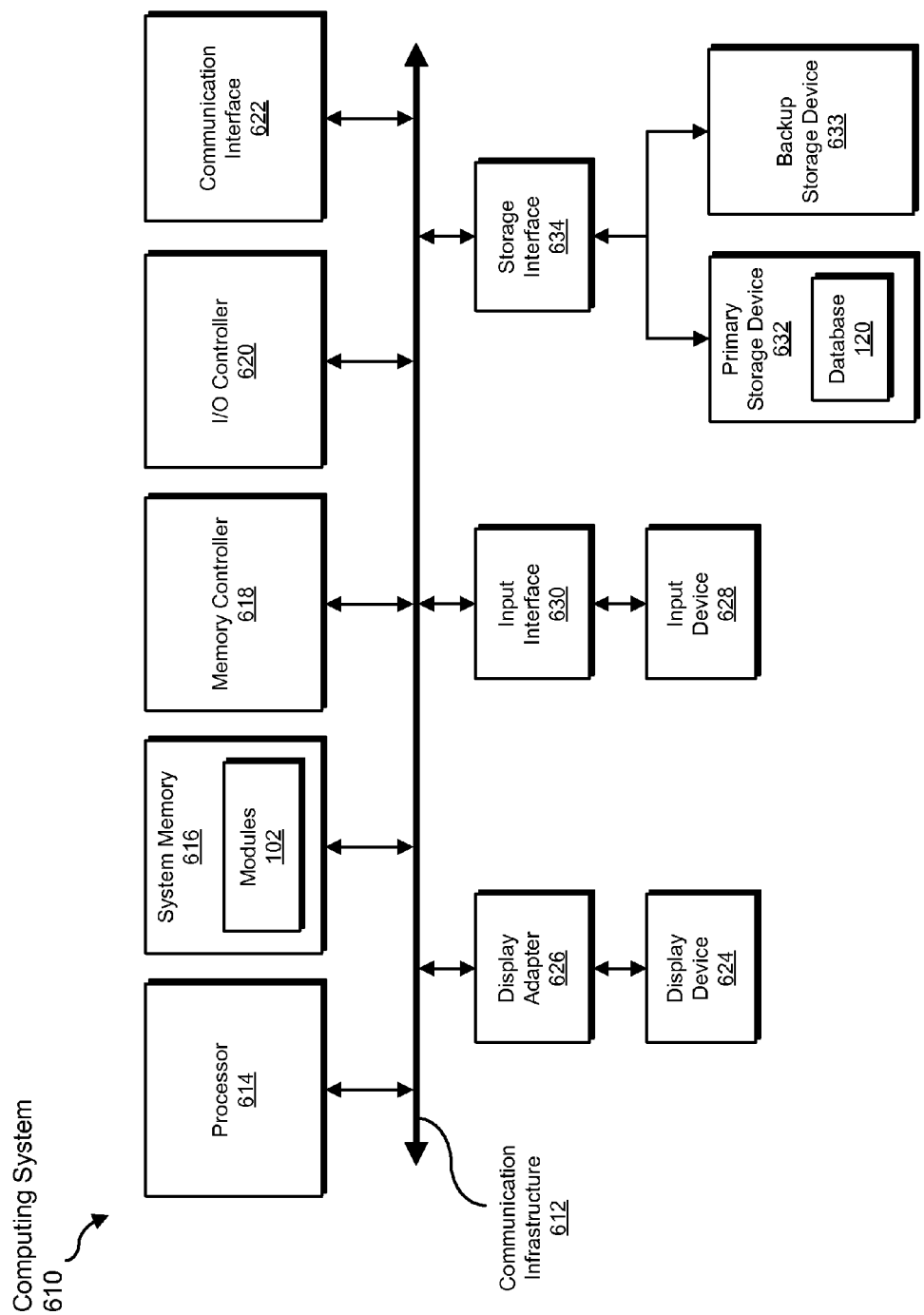
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, detecting, evaluating, determining, applying, performing, retrieving, generating, configuring, registering, correcting, preventing, prioritizing, and overriding steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
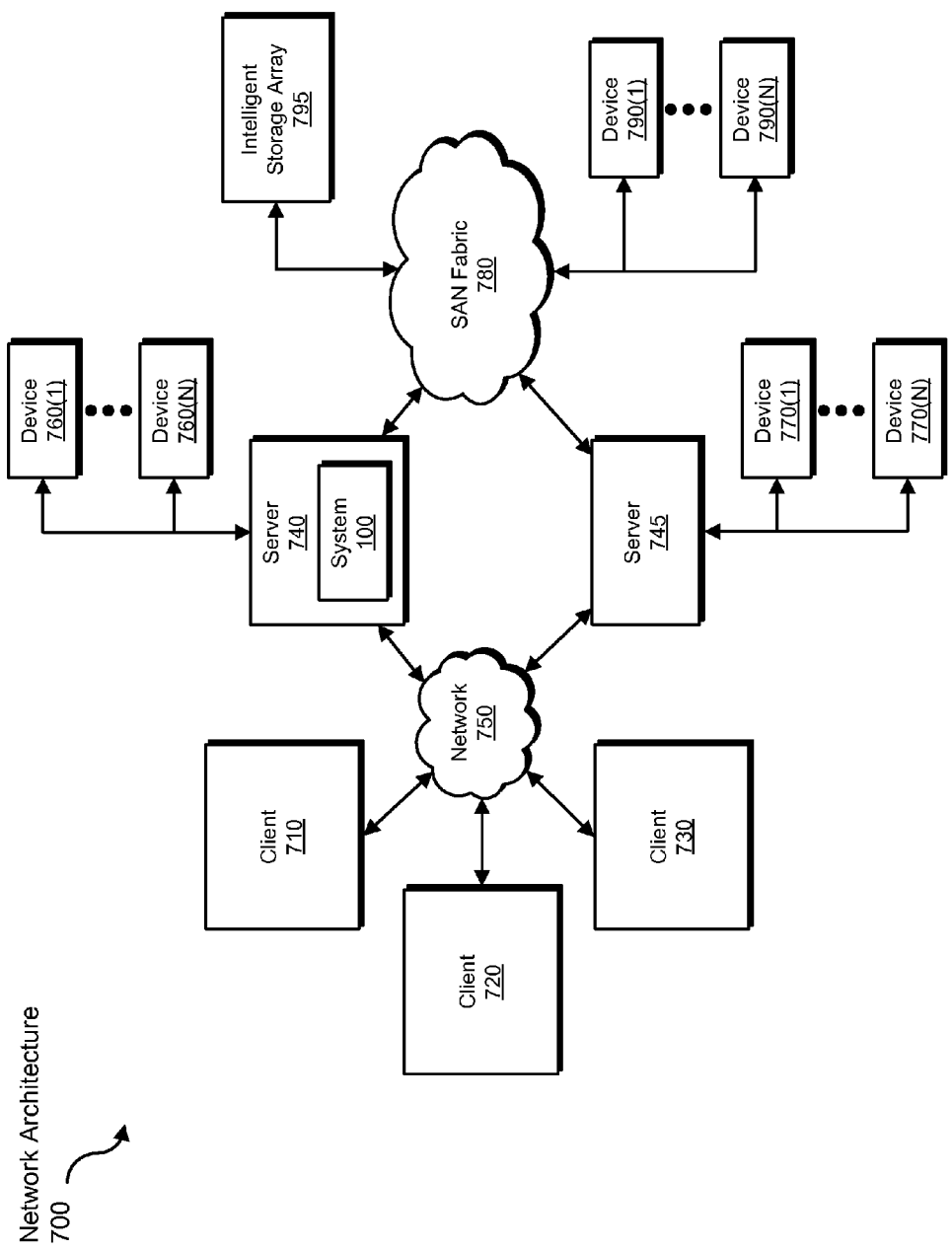
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, detecting, evaluating, determining, applying, performing, retrieving, generating, configuring, registering, correcting, preventing, prioritizing, and overriding steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for proactively evaluating failover nodes prior to the occurrence of failover events.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a conventional computer cluster into a system that is capable of proactively evaluating failover nodes prior to the occurrence of failover events.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for proactively evaluating failover nodes prior to the occurrence of failover events, at least a portion of the method being performed by a computing device comprising at least one processor, the method comprising:
    identifying at least one primary node that services at least one application;
    identifying at least one failover node designated to service the application if the primary node were to fail;
    prior to detecting failure of the primary node, proactively evaluating the failover node's ability to service the application if the primary node were to fail by:
    identifying a failover policy that specifies criteria that the failover node must satisfy in order to adequately service the application;
    determining, by applying the criteria of the failover policy to the failover node, that the failover node would be unable to adequately service the application if the primary node were to fail;
    in response to determining that the failover node would be unable to adequately service the application if the primary node were to fail, proactively performing at least one corrective action that would cause the application to be adequately serviced if the primary node were to fail.

2. The method of claim 1, wherein identifying the failover node comprises:
    retrieving a prioritization list that specifies a user-defined order for selecting failover nodes if the primary node were to fail;
    identifying the failover node within the prioritization list.

3. The method of claim 1, wherein identifying the failover node comprises:
    identifying a plurality of failover candidates;
    automatically generating, by applying the criteria of the failover policy to the failover candidates, a prioritization list that identifies a preferred order for selecting failover nodes from the failover candidates if the primary node were to fail;
    identifying the failover node within the prioritization list.

4. The method of claim 3, further comprising, upon generating the prioritization list, automatically configuring each failover node identified in the prioritization list to service the application.

5. The method of claim 1, wherein proactively evaluating the failover node's ability to service the application comprises evaluating the failover node's ability to service the application on a periodic basis.

6. The method of claim 1, wherein proactively evaluating the failover node's ability to service the application comprises:
    registering with a monitoring framework to be notified of events that would impact the failover node's ability to service the application;
    receiving notification, via the monitoring framework, of an event that would impact the failover node's ability to service the application.

7. The method of claim 1, wherein proactively evaluating the failover node's ability to service the application comprises:

identifying at least one attribute flag associated with the failover node that identifies the failover node's ability to service the application;

determining, by evaluating the attribute flag associated with the failover node, that the failover node would be unable to adequately service the application if the primary node were to fail.

8. The method of claim 1, wherein proactively performing the corrective action comprises at least one of:

generating at least one notification that indicates that the failover node is unable to adequately service the application;

automatically correcting at least one issue that is preventing the failover node from being able to adequately service the application;

preventing the failover node from servicing the application if the primary node were to fail;

prioritizing at least one other failover node that satisfies the criteria of the failover policy over the failover node.

9. The method of claim 8, wherein prioritizing the other failover node that satisfies the criteria of the failover policy over the failover node comprises overriding a prioritization list that identifies a preferred order for selecting failover nodes if the primary node were to fail.

10. A system for proactively evaluating failover nodes prior to the occurrence of failover events, the system comprising:

an identification module programmed to:

identify at least one primary node that services at least one application;

identify at least one failover node designated to service the application if the primary node were to fail;

an evaluation module programmed to proactively evaluate, prior to detecting failure of the primary node, the failover node's ability to service the application if the primary node were to fail by:

identifying a failover policy that specifies criteria that the failover node must satisfy in order to adequately service the application;

determining, by applying the criteria of the failover policy to the failover node, that the failover node would be unable to adequately service the application if the primary node were to fail;

a correction module programmed to proactively perform, in response to the determination that the failover node would be unable to adequately service the application if the primary node were to fail, at least one corrective action that would cause the application to be adequately serviced if the primary node were to fail;

at least one processor configured to execute the identification module, the evaluation module, and the correction module.

11. The system of claim 10, wherein the identification module identifies the failover node by:

retrieving a prioritization list that specifies a user-defined order for selecting failover nodes if the primary node were to fail;

identifying the failover node within the prioritization list.

12. The system of claim 10, wherein the identification module identifies the failover node by:

identifying a plurality of failover candidates;

automatically generating, by applying the criteria of the failover policy to the failover candidates, a prioritization list that identifies a preferred order for selecting failover nodes from the failover candidates if the primary node were to fail;

identifying the failover node within the prioritization list.

13. The system of claim 12, further comprising a configuration module programmed to automatically configure, upon generation of the prioritization list, each failover node identified in the prioritization list to service the application.

14. The system of claim 10, wherein the evaluation module proactively evaluates the failover node's ability to service the application on a periodic basis.

15. The system of claim 10, wherein the evaluation module proactively evaluates the failover node's ability to service the application by:

registering with a monitoring framework to be notified of events that would impact the failover node's ability to service the application;

receiving notification, via the monitoring framework, of an event that would impact the failover node's ability to service the application.

16. The system of claim 10, wherein the evaluation module proactively evaluates the failover node's ability to service the application by:

identifying at least one attribute flag associated with the failover node that identifies the failover node's ability to service the application;

determining, by evaluating the attribute flag associated with the failover node, that the failover node would be unable to adequately service the application if the primary node were to fail.

17. The system of claim 10, wherein the correction module proactively performs the corrective action by at least one of:

generating at least one notification that indicates that the failover node is unable to adequately service the application;

automatically correcting at least one issue that is preventing the failover node from being able to adequately service the application;

preventing the failover node from servicing the application if the primary node were to fail;

prioritizing at least one other failover node that satisfies the criteria of the failover policy over the failover node.

18. The system of claim 17, wherein the correction module prioritizes the other failover node that satisfies the criteria of the failover policy over the failover node by overriding a prioritization list that identifies a preferred order for selecting failover nodes if the primary node were to fail.

19. A non-transitory computer-readable-storage medium comprising one or more computer-executable instructions that, when executed by at least one processor of a computing device, cause the computing device to:

identify at least one primary node that services at least one application;

identify at least one failover node designated to service the application if the primary node were to fail;

prior to detecting failure of the primary node, proactively evaluate the failover node's ability to service the application if the primary node were to fail by:

identifying a failover policy that specifies criteria that the failover node must satisfy in order to adequately service the application;

determining, by applying the criteria of the failover policy to the failover node, that the failover node would be unable to adequately service the application if the primary node were to fail;

in response to determining that the failover node would be unable to adequately service the application if the primary node were to fail, proactively perform at least one corrective action that would cause the application to be adequately serviced if the primary node were to fail.

20. The non-transitory computer-readable-storage medium of claim 19, wherein the corrective action comprises at least one of:
- generating at least one notification that indicates that the failover node is unable to adequately service the application;
- automatically correcting at least one issue that is preventing the failover node from being able to adequately service the application;
- preventing the failover node from servicing the application if the primary node were to fail;
- prioritizing at least one other failover node that satisfies the criteria of the failover policy over the failover node.

* * * * *